United States Patent
Boyle et al.

(10) Patent No.: US 10,481,959 B2
(45) Date of Patent: Nov. 19, 2019

(54) METHOD AND SYSTEM FOR THE IDENTIFICATION OF MUSIC OR OTHER AUDIO METADATA PLAYED ON AN IOS DEVICE

(71) Applicant: SPOTIFY AB, Stockholm (SE)

(72) Inventors: Brian Boyle, Dublin (IE); Brendan O'Driscoll, Dublin (IE); Craig Watson, Dublin (IE); Aidan Sliney, Dublin (IE)

(73) Assignee: SPOTIFY AB, Stockholm (SE)

( * ) Notice: Subject to any disclaimer, the term of this patent is extended or adjusted under 35 U.S.C. 154(b) by 0 days.

(21) Appl. No.: 15/323,701

(22) PCT Filed: Apr. 2, 2015

(86) PCT No.: PCT/EP2015/057343
§ 371 (c)(1),
(2) Date: Jan. 3, 2017

(87) PCT Pub. No.: WO2016/000839
PCT Pub. Date: Jan. 7, 2016

(65) Prior Publication Data
US 2017/0161119 A1 Jun. 8, 2017

Related U.S. Application Data

(60) Provisional application No. 62/020,445, filed on Jul. 3, 2014.

(51) Int. Cl.
*G06F 9/54* (2006.01)
*G06F 16/632* (2019.01)
*G06F 16/683* (2019.01)
*G06K 9/00* (2006.01)
*G06Q 50/00* (2012.01)
*G10L 25/51* (2013.01)

(52) U.S. Cl.
CPC ............ *G06F 9/541* (2013.01); *G06F 16/634* (2019.01); *G06F 16/683* (2019.01); *G06K 9/00496* (2013.01); *G06Q 50/01* (2013.01); *G10L 25/51* (2013.01)

(58) Field of Classification Search
CPC ............... G06F 9/541; G06F 17/30758; G06F 17/30743; G06Q 50/01; G06K 9/00496; G10L 25/51
USPC ........................................................ 704/231
See application file for complete search history.

(56) References Cited

U.S. PATENT DOCUMENTS

2010/0235328 A1 9/2010 Sukanen et al.
2011/0252430 A1* 10/2011 Chapman ................ G06F 9/485
  718/107

(Continued)

OTHER PUBLICATIONS

Anonymous: "Shazam (service)—Wikipedia, the free encyclopedia", Jun. 29, 2014, XP55202991, 7 pages.

(Continued)

*Primary Examiner* — Bharatkumar S Shah
(74) *Attorney, Agent, or Firm* — Tucker Ellis LLP (57) ABSTRACT

The invention provides a method and apparatus comprising at least one processor; at least one memory including computer program code, at least one memory and the computer program code configured to, with the at least one processor, cause the apparatus to perform identification of music data or other audio metadata played on an iOS device.

17 Claims, 9 Drawing Sheets

(56) References Cited

U.S. PATENT DOCUMENTS

2012/0072852 A1* 3/2012 Svendsen .............. G06Q 10/10
715/747
2012/0290653 A1* 11/2012 Sharkey ................ H04W 4/023
709/204
2014/0223099 A1* 8/2014 Kidron ................ G06F 12/0806
711/118

OTHER PUBLICATIONS

International Search Report and Written Opinion issued by European Patent Office for PCT Application No. PCT/EP2015/057343, dated Jul. 23, 2015, 6 pages.
Communication pursuant to Article 94(3) issued by European Patent Office for European Patent Application No. 15720275.5, dated Dec. 8, 2017, 7 pages.
"Last.fm", Jun. 20, 2014, XP55431143, retrieved from the Internet on Dec. 1, 2017, https://en.wikipedia.org/w/index.php?title=Last.fm&oldid=613636183, 24 pages.
Summons to attend oral proceedings pursuant to Rule 115(1) EPC, dated Jun. 21, 2019, for European Patent Application No. 15720275.5, 9 pages.

* cited by examiner

METHOD AND SYSTEM FOR THE IDENTIFICATION OF MUSIC OR OTHER AUDIO METADATA PLAYED ON AN IOS DEVICE

FIELD

The present invention relates generally, as indicated, to a method and apparatus for the identification of music or other audio metadata played on an iOS device, and more particularly, in relation to audio files that are played through the native iPod application on iOS devices.

DESCRIPTION OF RELATED ART

Apple devices and their underlying operating system, iOS, have emerged as one of the most ubiquitous operating systems/hardware platforms in the world. iOS is a fully featured modern operating system, which is extensively documented and fully supported by Apple Inc. Overall, the operating system is state of the art and the hardware is proven, affordable and readily available. At the time of writing, 500 Million iPhones have been sold globally with advantages such as:—
- Wi-Fi and 3G and Bluetooth communication capabilities built in;
- Camera, video and audio interface;
- Easy updates and distribution via the iTunes store or a private distribution server;
- Software-defined interface; and
- Rigidly controlled and documented development tools.

Despite the above-mentioned advantages, iOS is a closed operating system and so application developers are limited by the sandboxed nature of the OS (eg restricting software to dealing only with the files or capabilities it absolute needs to). One significant drawback in this approach adopted by Apple is the inflexibility for iOS apps to communicate with each other. In fact, the ability of apps to communicate directly with each other is still limited to the idea of custom URLs. This system lets one app send data to another by asking the OS to "open" a specially-crafted address—similar to the ones used to access a website—which is then registered by the second app when it is installed.

In addition to the lack of communication between applications, another issue that iOS developers often encounter is the limitation around background processing. Compared to the Android Operating System for example, where background processes can run continuously, the background processes are arbitrarily restricted on iOS. Apple have adopted this position in order to improve battery life and to improve the user's experience with the foreground app. As a result, Apple gives an app developer very limited CPU time when an app closes to finish processes (eg uploading photos) in order to conserve battery. Ultimately this means that the multitasking API is very restrictive of what you can do when your app is in the background or dead.

One such limitation of this system is that the native iPod audio application installed on each iPhone cannot communicate with any third party application if such an application is terminated or running in the background. It is not therefore possible to monitor the state of the iPod player when an app is terminated or running in the background. In order to share such a listening history, said user will have to either play their music through a third party music player or will need to retrospectively tag what songs they have played and share these manually through a third party application when such an app is open.

This is despite the fact that there is a technological trend toward the automatic sharing of media consumption habits in real-time so that users can converse, compare and curate content at the digital water-cooler. The emergence of such automatic sharing on numerous platforms such as Facebook where news articles read and movies watched are shared with a user's network. More specifically, using Facebook OpenGraph (and log-in authorisation protocols) a user can seamlessly share their music or other audio metadata listening habits on a number of subscription streaming services (eg Spotify, Deezer and Pandora). As a user listens to music on these services, their consumption patterns are broadcasted out to their friends and followers (assuming such permissions are granted by the user).

The sandboxed nature and multi-tasking restrictions of iOS devices runs contrary to this trend and the current state of the art does not permit an iPhone user to automatically share what music or other audio metadata they are listening to through the native iPod application.

It is an object to provide a system and method for the identification of music or other audio metadata played on an iOS device that overcomes the above mentioned drawbacks.

SUMMARY

The invention provides a system and method, as set out in the appended claims, for co-ordinating specific background services on iOS in order to open up communication between the native iPod application and third party applications on an iOS device. This solution allows an app developer to access the music or other audio metadata from the native iPod player, even if the third party app is closed or running in the background and permits the sharing of this information automatically and in real-time through a chosen developer interface. The invention provides a system and method for the identification of music or other audio metadata played on an iOS device that overcomes the above mentioned drawbacks.

In addition, once a song or other audio metadata has been played by a user, it is now possible to determine the location of the iOS device through the use of either GPS, wireless triangulation and system networks or a combination of same. This means that it is also possible to determine the location of where a song or other audio metadata is played on an iOS device. Despite this advance in technology, traditional music services tend not utilise this location-based information when sharing content between users. The invention ensures that, where possible, locational information is appended to any music or other audio metadata captured through a service by the service.

Finally, it is also possible to know the exact timestamp of when a song or other audio metadata is played on an iOS device. As will be explained in further details, the invention uses the combination of music or other audio metadata with the location and timestamp of the play in order to properly identify who is listening to what, where and when on an iOS device even when an app is closed or running in the background.

The present invention is an improvement over conventional systems in that method and apparatus for the identification of music or other audio metadata played on an iOS device, and more particularly, in relation to audio files that are played through the native iPod application on iOS devices is both unique and an improvement over the prior art.

It is therefore an object of the present invention to provide a new and improved method and apparatus for the identification of music or other audio metadata played on an iOS device that allows app developers to circumvent the limitations of iOS with communication between applications and the restrictions with background processing generally.

It is another object of the present invention to provide a new and improved music or other audio metadata identification system and method in respect of the native iPod application on iOS devices that displays this information in an efficient manner targeted to users who are the most likely to be interested in the information.

It is another object of the present invention to provide a new and improved identification system and method that is capable of working with real-time GPS location-based systems as well as pre-loaded mapping software.

It is another object of the present invention to provide a new and improved identification system and method that is capable of working with temporal-based systems so that such information is searchable and filterable by time.

It is another object of the present invention to provide a new and improved identification system and method that is capable of being used by app developers to display the captured music and other audio metadata on third party applications.

It is another object of the present invention to provide a new and improved identification system and method that is capable of being used by app developers to provide users with the ability to share captured music and other audio metadata on other online platforms.

It is still yet another object of the present invention to provide a new and improved identification system and method that is capable of being used by app developers to allow users to purchase said music and other audio metadata identified or purchase other affiliated items associated with the identified music or other audio metadata.

In one embodiment any such music or audio metadata may be purchased by a user on the iTunes store (or such other affiliated store).

There is also provided a computer program comprising program instructions for causing a computer program to carry out the above method which may be embodied on a record medium, carrier signal or read-only memory.

Other objects, features and advantages of the invention will be apparent from the following detailed disclosure, taken in conjunction with the accompanying sheets of drawings, wherein like reference numerals refer to like parts.

BRIEF DESCRIPTION OF THE DRAWINGS

The invention will be more clearly understood from the following description of an embodiment thereof, given by way of example only, with reference to the accompanying drawings, in which:—

DETAILED DESCRIPTION OF THE DRAWINGS

A method and apparatus for the identification of music or other audio metadata played on an iOS device, and more particularly, in relation to audio files that are played through the native iPod application on iOS devices.

While this invention is susceptible of embodiment in many different forms, there is shown in the drawings and will herein be described in detail several specific embodiments, with the understanding that the present disclosure is to be considered merely an exemplification of the principles of the invention and the application is limited only to the appended claims.

Although several embodiments of the invention are discussed with respect to music or other audio metadata on iOS devices, in communication with a network, it is recognized by one of ordinary skill in the art that the embodiments of the inventions have applicability to any type of content playback (eg video, books, games) involving any device (wired and wireless local devices or both local and remote wired or wireless devices) capable of playing content that can be identified, or capable of communication with such a device.

Figure 1:
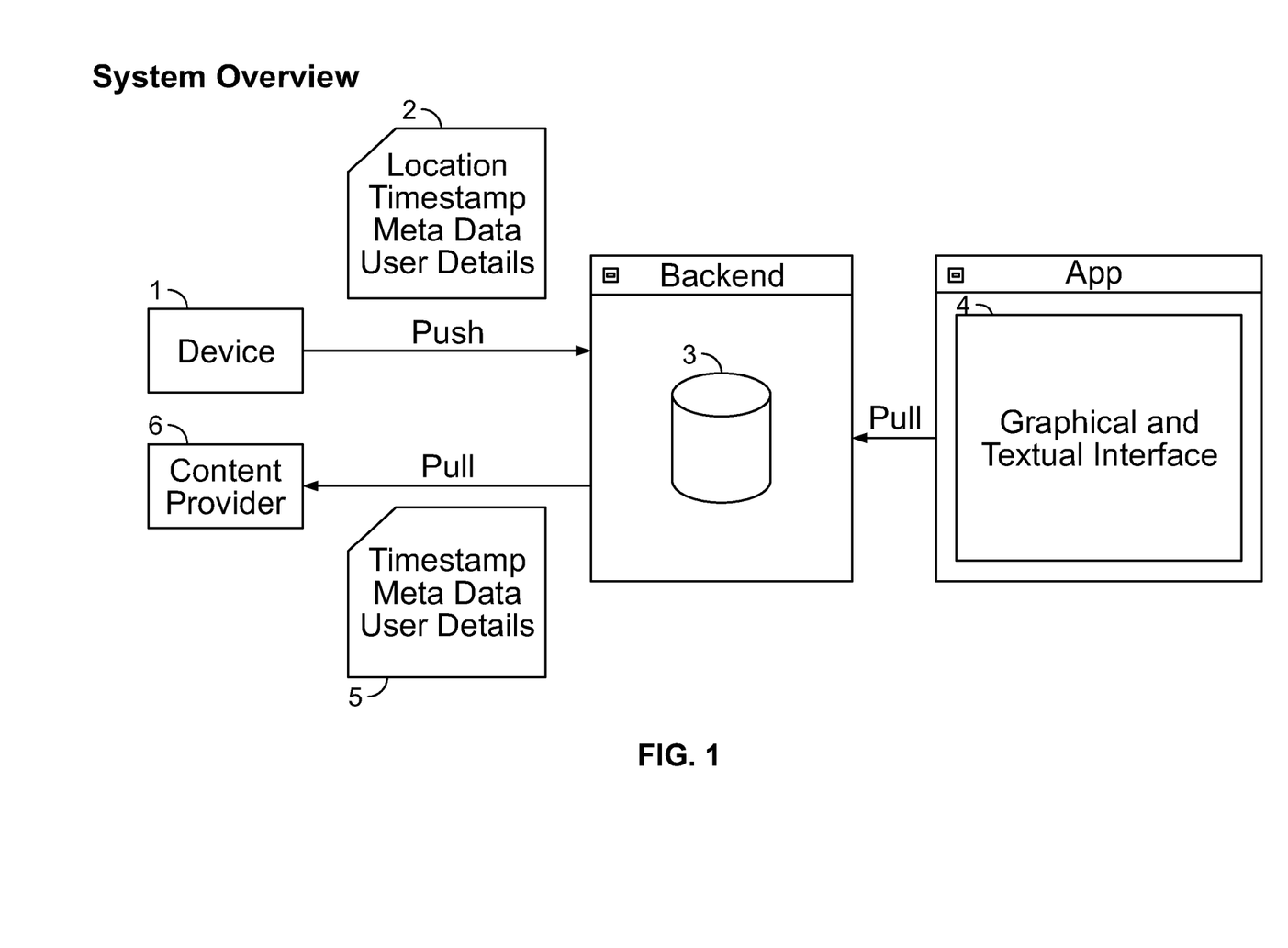
FIG. 1 is a diagram of a system for identifying music or other audio metadata on an iOS device.

FIG. 1 is a diagram of a system for identifying played content on an iOS device, according to one embodiment. By way of example, the communication between push of location, timestamp, metadata and user details at 2 between the device 1 and the backend 3 and the communication between the pull of location, timestamp, metadata and user details at 5 between the backend 3 and the content provider 5 can include one or more networks such as a data network (not shown), a wireless network (not shown), a telephony network (not shown) or any combination thereof. It is contemplated that the data network may be any local area network (LAN), metropolitan are network (MAN), wide area network (WAN), the Internet, or any other suitable packet-switched network. In addition, the wireless network may be, for example, a cellular network and may employ various different technologies including code division multiple access (CDMA), enhanced data rates for global evolution (EDGE), general packet radio service (GPRS), global system for mobile communications (GSM), Internet protocol multimedia subsystem (IMS), universal mobile telecommunications system (UMTS) as well as any other suitable wireless medium (eg microwave access (WiMAX), Long Term Evolution (LTE) networks, wireless fidelity (WiFi), satellite and the like.

The system set out in FIG. 1 included a music identification service 1, 2, 5 and 6 and a database interface process 3. The system includes instructions for finding metadata about music or other audio files. The database interface process 3 is the interface between the device 1 and the content database 6, and is used to retrieve and store metadata, and to retrieve and store content.

In the illustrated embodiment, the services include played content identification process 2 and 5 to identify played music or other audio metadata and to use the database interface process 3 to store and retrieve the event data that describes what is being played, where it being played and when.

In step 2, the event generator process detects the initial operation of the device, such as during power up or movement to a cell of a different base station or access point. An event geolocation message is sent for receipt by the content service system. The geolocation event message indicates the geographic location of the mobile device, determined in any manner known in the art. For example, in some embodiments, the mobile terminal includes a Global Positioning System (GPS) receiver and logic to determine the geographic location of the mobile terminal. In some embodiments, geolocation message is omitted.

In some embodiments of 2 and 5 the user ID field 2 and 5 may be used, such as a node identifier for the device used for playback, a user supplied name, an email address or an ID assigned to a user who registers with a content service system (eg Facebook). In steps 2 and 5, the timestamp field is also retrieved which holds data that indicates when the event occurred on the device that plays the content. In some embodiments, the timestamp is omitted. The content duration field (not shown) in steps 2 and 5 holds data that indicates the time needed to play the content fully for appreciation by a human user. This field in certain embodiments can be omitted. The content ID in steps 2 and 5 holds data that uniquely identifies the content being played (eg the music or audio metadata). In some embodiments, the field holds data that indicates a name of the content and a name of an artist who generated the content, such as song title and singer name. This content ID, if a music file, often contains the genre of the music played together with the song duration and other related metadata and other references including, but not limited to, International Standard Recording Codes (ISRC).

In circumstances where the music or audio metadata is not stored on the device 1, and pushed 2 to the database 3, often a Content Distribution Network (CDN) as embodied in 6 is the source of the music or audio metadata. Typically, the music store authorizes the CDN to download the client and then directs a link on the user's browser client to request the content from the CDN. The content is delivered to the user through the user's browser client as data formatted, for example, according to HTTP or the real-time messaging protocol (RTMP). As a result, the content is stored as local content 6 on the user's device 1. The local content arrives on the device either directly from the CDN or indirectly through some other device (eg a wired note like other host) using a temporary connection (not shown) between mobile terminal for example and other host.

Once this information has been added to the database 3 and stored locally, the application itself 4 on a user's mobile device can then be used to access and retrieve the music or other audio metadata. Depending on the availability of the location, metadata, user details and timestamp, an app developer can therefore use the present invention to distinguish what music or other audio file was played, when it was played, where it was played and by whom.

Figure 2:
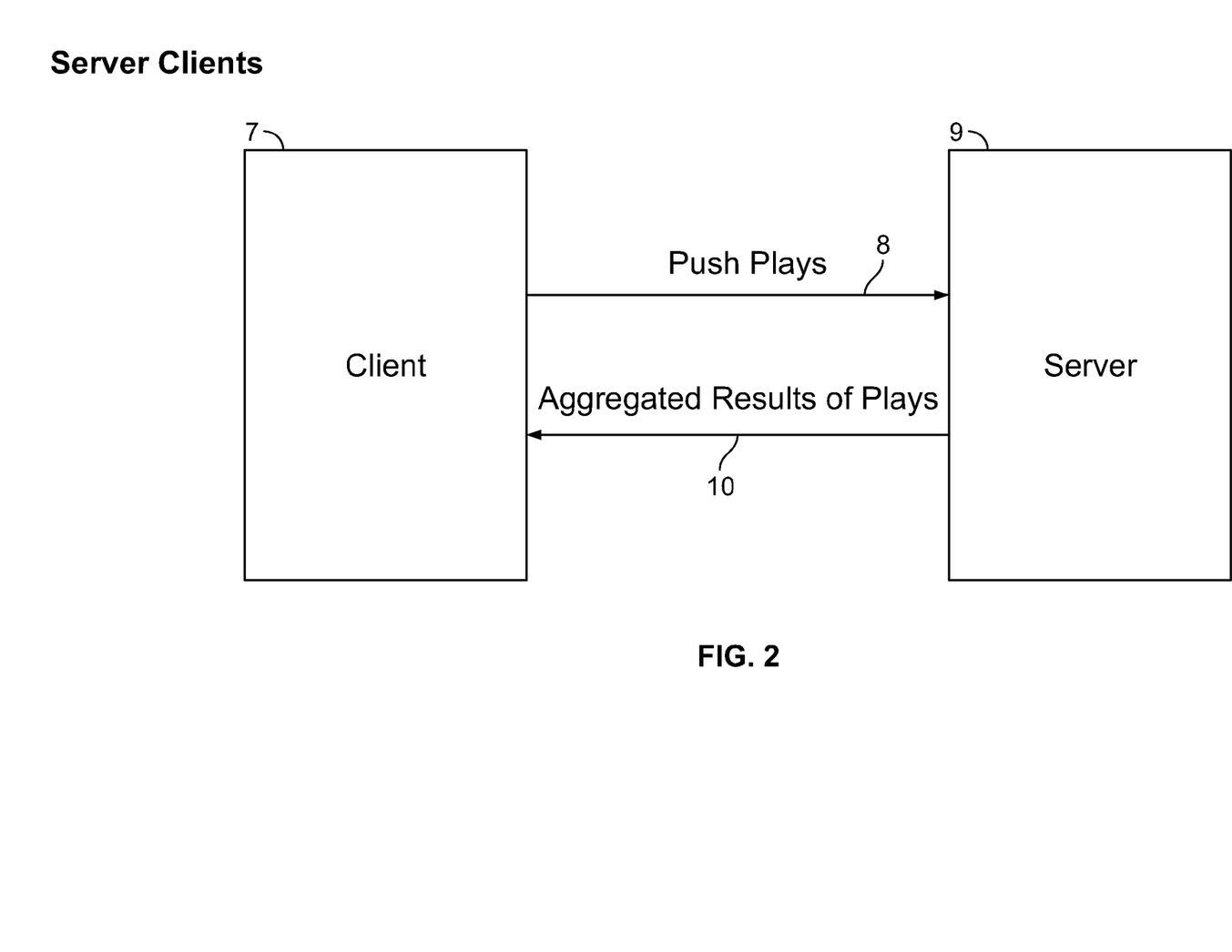
FIG. 2 is a diagram of the server to client interaction that is used to implement an embodiment of the invention.

FIG. 2 is a diagram of the server to client interaction that is used to implement an embodiment of the invention. The client-server model of computer process interaction is widely known and used. According to the client-server model, a client process 7 sends a message including a request to a server process 9, and the server process responds by providing a service. The server process 9 may also return a message with a response to the client process 7. Often the client process and server process 9 execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" 7 and "server" 9 refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others. In this case, the client 7 pushes plays 8 to the server 9 which then returns the aggregated results of the plays 10 back to the client 7.

Figure 3:
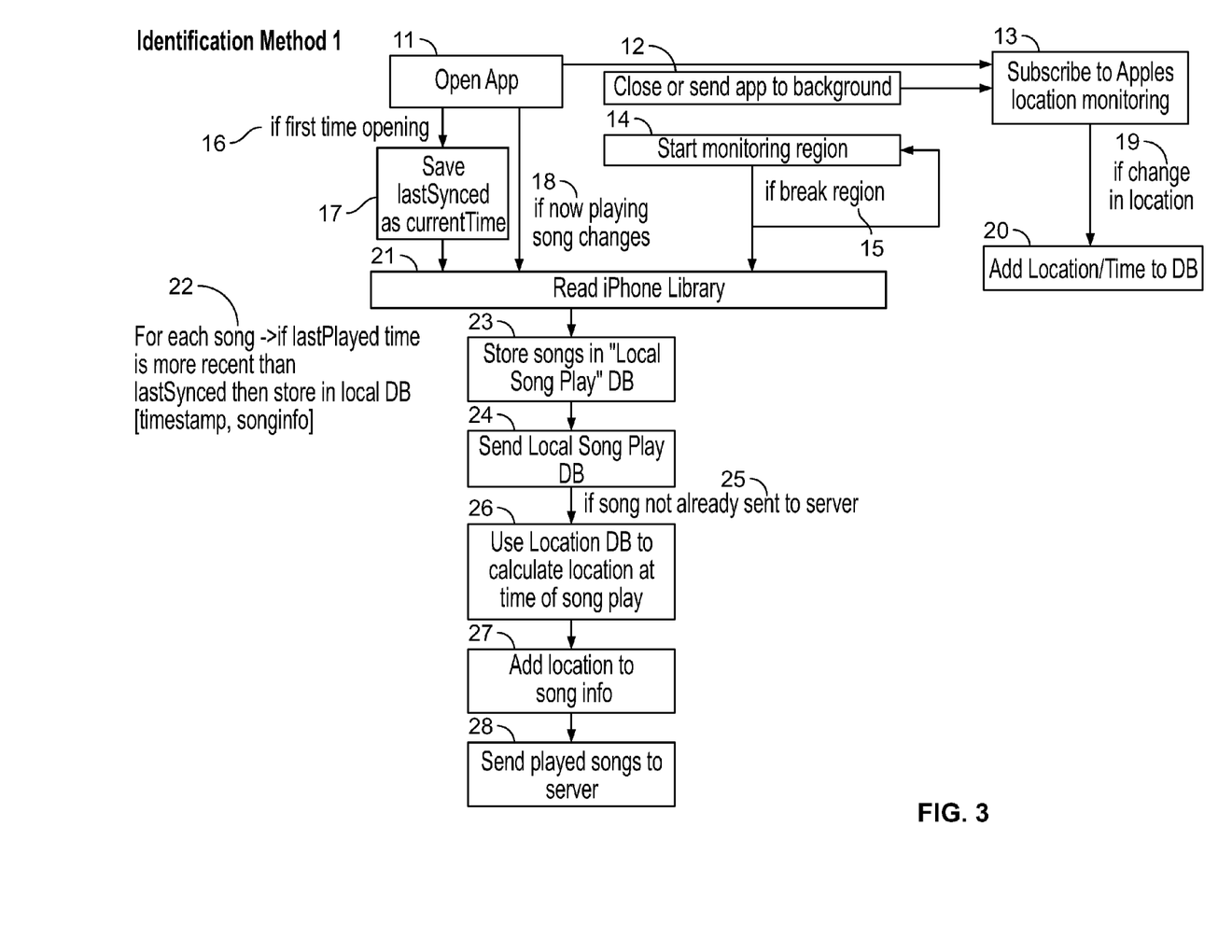
FIG. 3 is a schematic view of the first embodiment of how the invention can be used to identify music or other audio metadata on an iOS device.

FIG. 3 is a schematic view of the first embodiment of how the service identifies content on the iOS platform. Taking an example of where the device 1 is a mobile device, the service begins with one of three possible events (a) either the application is opened 11 for the first time (b) is opened for a second or subsequent time or (c) in cases when the app is closed or dormant in the background 12.

If the app is opened for the first time 16 the service saves the last synced as the current time 17. The next step involves the iPhone library being read 21 to query what the last played songs have been in the phones library and proceeds to step 22 described below.

If the app is opened (any time after being opened for the first time), the service according to one aspect of the invention then checks what the now playing song is and if this has changed 18. If it has, then the service reads the iPhone library 21 and proceeds to step 22 described below.

If the app is closed or if the app is dormant in the background 12, the service will start monitoring the region 14 of the device 1. If and when the user then breaks the region as outlined in step 15, and as outlined in further detail in FIG. 6, the service assesses if the now playing song has changed since the last query 18. If the now playing song has changed 18, the service reads the iPhone library 21 and proceeds to step 22 described below. If the now playing song has not changed, the service does not proceed again until the user breaks the region that is being monitored 15.

In addition, the service subscribes to Apple's location monitoring 13 and if there is a change in location 19, the location and time of this change is added to a location database 20 which is then used to append location to the song play 27 in advance of being sent to a server 28.

For every song queried on the iOS device's library, if the last played time is more recent than the last synced 22 then it is stored in the local database 23. An example of this would be when the last sync takes place at 11 am. If the last played song is identified at 1 μm (which is two hours after the last sync), then the song can be stored in the Local Song Play DB 23. Taking another example, if the last played song identified at 10 am, then the song will not be stored in the Local Song Play DB 23 as the last sync occurred later than the last played song. The next step involves a scan of the Local Song play Database 24 and if this song has not already been sent to the server 25 it will be sent to the server 28. As outlined above, before step 28, the system uses the location database to calculate the location at the time that the song was played 26. If this query is successful, location data is then added to the song information 27. For the purposes of this FIG. 3, song metadata is just one embodiment of the type of metadata that can be identified on an iOS device as this could apply equally to audio files or other media content played through the device's native players (eg video). The result is that the music or other audio metadata played is identified by the system and allows a third party app developer to use this information 4. A visual representation of this is set out in the example of a front-end activity feed in a third party application FIG. 7.

Figure 4:
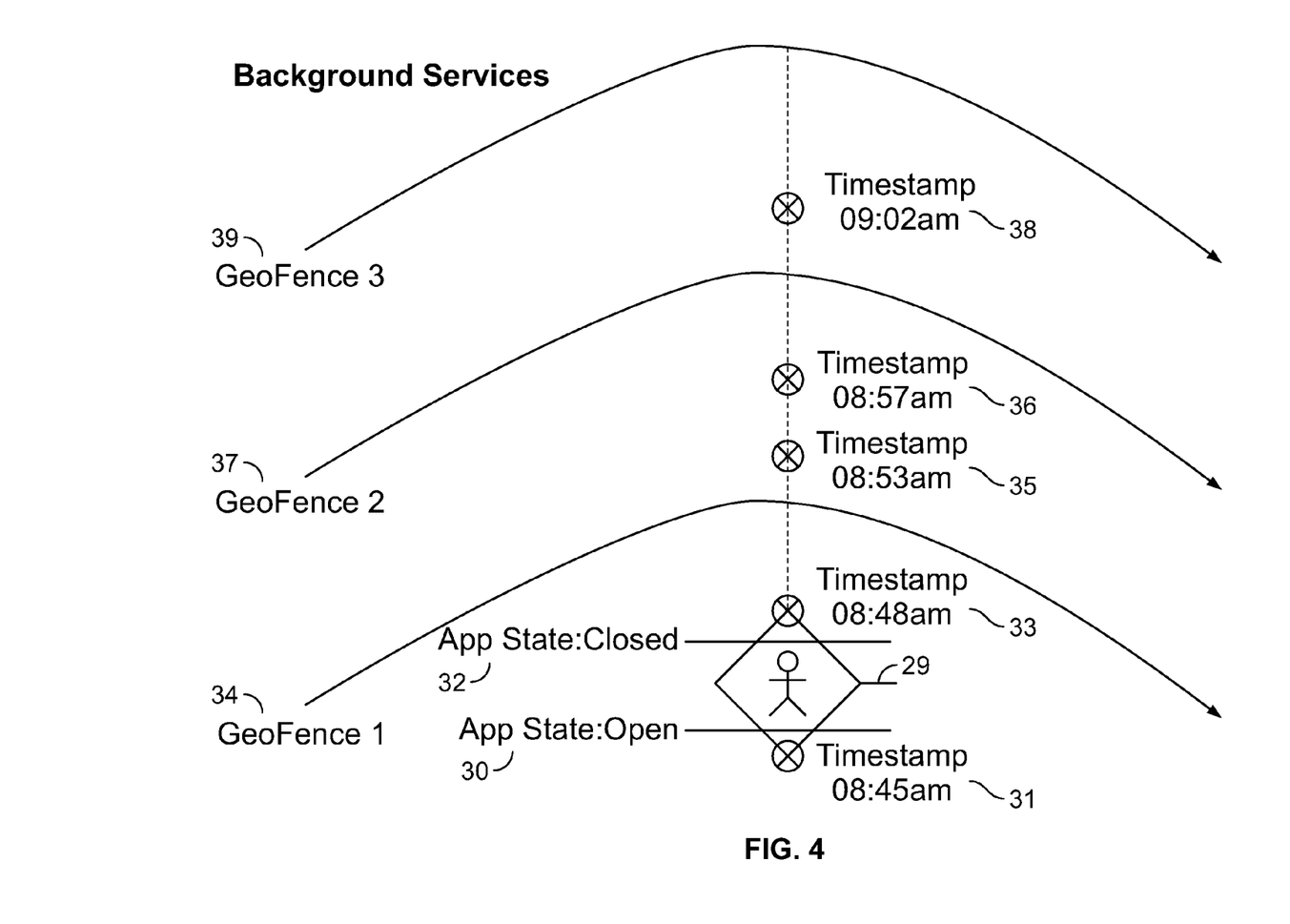
FIG. 4 is a diagram which outlines how locational background services are used in conjunction with the invention to identify music or other audio metadata played by a user on an iOS device.

FIG. 4 is a diagram which outlines how locational background services are used in conjunction with the invention to identify music or other audio metadata played by a user on an iOS device. When a user 29 is listening to music or other audio metadata on their iOS device and the application is open 30, then in cases where the last played time (08.45 am) is more recent than the last synced 31 then it is stores this information in the local database 23. In circumstances where the app is closed or running in the background, the service will start monitoring the region of the device 14. If a user 29 listens to another song at 08.48 am 33 and then proceeds to break GeoFence 1 34, the service assesses if the now playing song has changed since the last query 49. Until the next GeoFence 2 37 is broken, the service does not assess if now playing song has changed. The reason for this is to ensure that only a minimal amount of battery is used in the identification process. In the present example, the service will not query now playing song again when a user is moving (eg at 08.53 am 35 or 08.57 am 36) until GeoFence 2 is broken 37. At that point, the service reads the iPhone library 52 and proceeds to step 53 described above. The same treatment will apply to the song captured at 09.02 am 38 and no query will be executed until GeoFence 3 39 is broken. Note that the radii of the GeoFences can be arbitrarily set by the present invention in order to maximise the optimum amount of queries needed without draining the iOS devices battery excessively.

Figure 5:
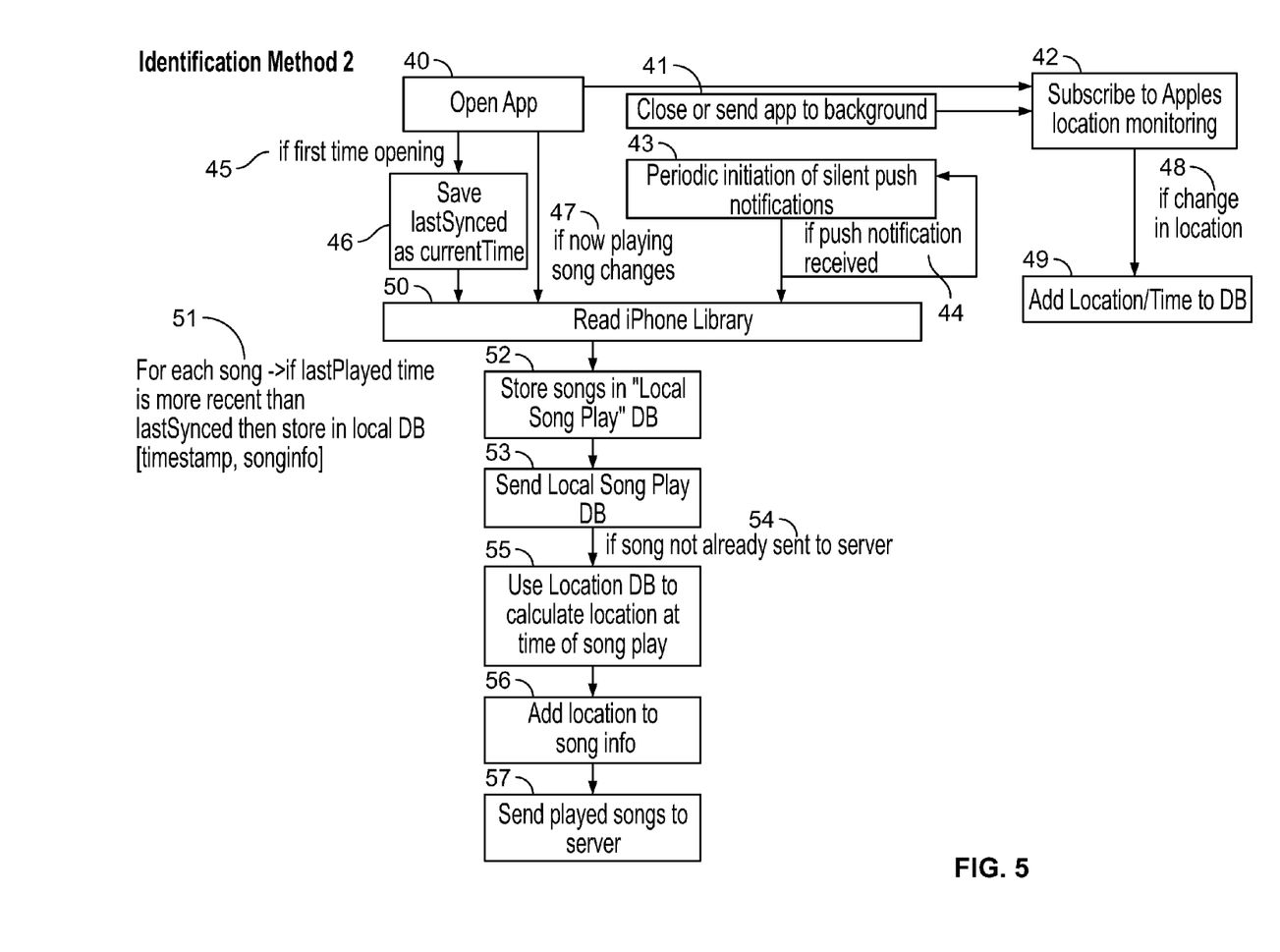
FIG. 5 is a schematic view of the second embodiment of how the invention can be used to identify music or other audio metadata on an iOS device.

FIG. 5 is a schematic view of the second embodiment of how the service identifies content on the iOS platform. Taking an example of where the device 1 is a mobile device, the service begins with one of three possible events (a) either the application is opened 40 for the first time (b) is opened for a second or subsequent time or (c) in cases when the app is closed or dormant in the background 41.

If the app is opened for the first time 45 the service saves the last synced as the current time 46. The next step involves the iPhone library being read 50 to query what the last played songs have been in the phones library and proceeds to step 51 described below.

If the app is opened (any time after being opened for the first time), the service then checks what the now playing song is and if this has changed 47. If it has, then the service reads the iPhone library 50 and proceeds to step 51 described below.

If the app is closed or if the app is dormant in the background and/or if location services are turned off, 41, the service will periodically send silent push notifications from the server 43 to the client device 1. If and when such a silent push notification is received as outlined in step 44, the service assesses if the now playing song has changed since the last query 47. If the now playing song has changed 47, the service reads the iPhone library 50 and proceeds to step 51 described below. If the now playing song has not changed, the service does not proceed again until the user receives a subsequent silent push notification 44.

In addition, the service subscribes to Apple's location monitoring 42 and if there is a change in location 48, the location and time of this change is added to a location database 49 which is then used to append location to the song play 56 in advance of being sent to a server 57.

For every song queried on the iOS device's library, if the last played time is more recent than the last synced 51 then it is stored in the local database 52. An example of this would be when the last sync takes place at 11 am. If the last played song is identified at 1 pm (which is two hours after the last sync), then the song can be stored in the Local Song Play DB 52. Taking another example, if the last played song is identified at 10 am, then the song will not be stored in the Local Song Play DB 52 as the last sync occurred later than the last played song. The next step involves a scan of the Local Song play Database 53 and if this song has not already been sent to the server 54 it will be sent to the server 57. As outlined above, before step 57, the system uses the location database to calculate the location at the time that the song was played 55. If this query is successful, location can then be added to the song information 56. For the purposes of this FIG. 5, song metadata is just one embodiment of the type of metadata that can be identified on an iOS device as this could apply equally to audio files or other media content played on through the device's native players (eg video). The result is that the music or other audio metadata played is identified by the system and allows a third party app developer to use this information 4. A visual representation of this is set out in the example of a front-end activity feed in a third party application FIG. 7.

Figure 6:
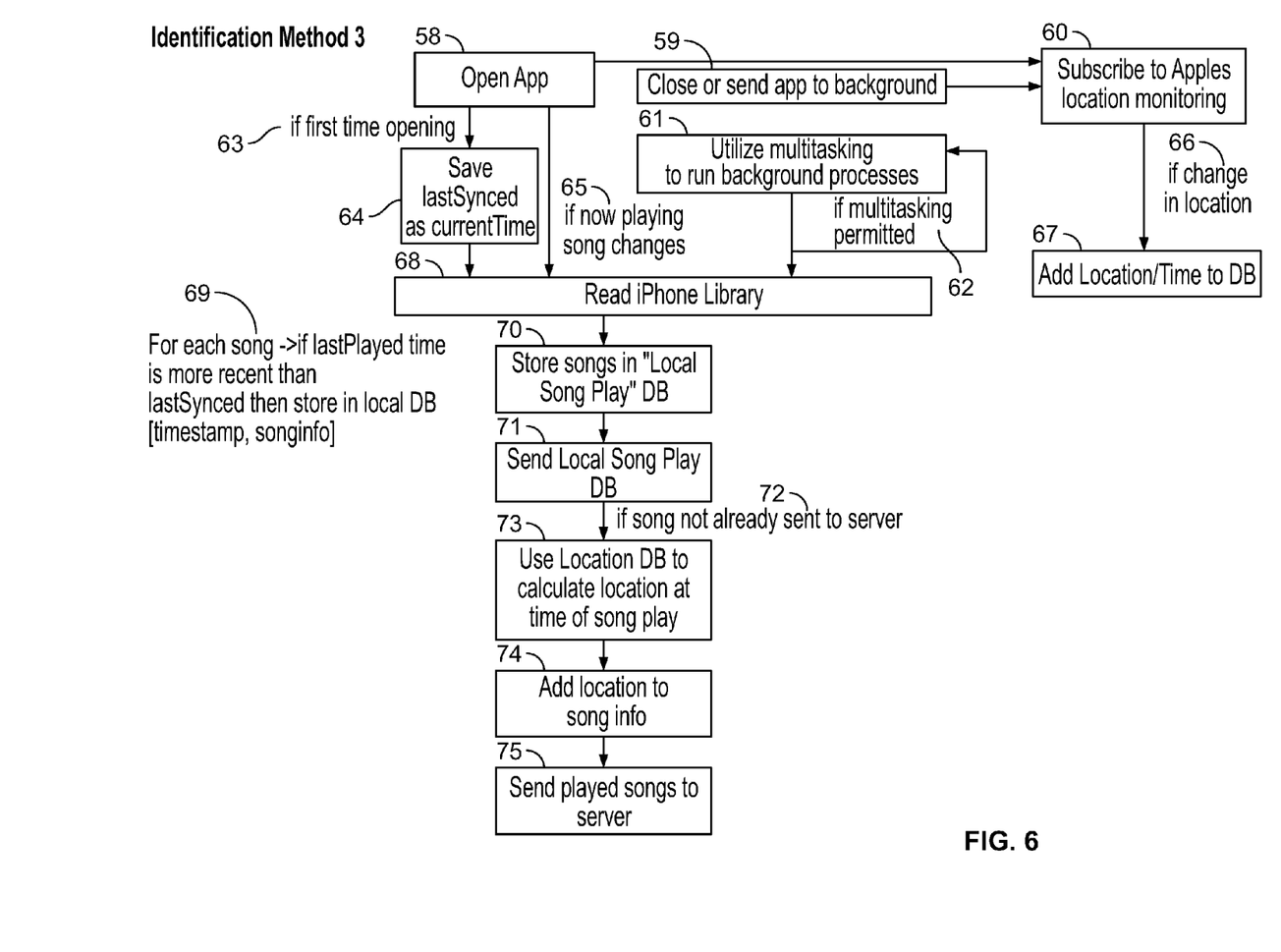
FIG. 6 is a schematic view of the third embodiment of how the invention can be used to identify music or other audio metadata on an iOS device.

FIG. 6 is a schematic view of the third embodiment of how the service identifies content on the iOS platform. Taking an example of where the device 1 is a mobile device, the service begins with one of three possible events (a) either the application is opened 58 for the first time (b) is opened for a second or subsequent time or (c) in cases when the app is closed or dormant in the background 59.

If the app is opened for the first time 63 the service saves the last synced as the current time 64. The next step involves the iPhone library being read 68 to query what the last played songs have been in the phones library and proceeds to step 68 described below.

If the app is opened (any time after being opened for the first time), the service then checks what the now playing song is and if this has changed 65. If it has, then the service reads the iPhone library 68 and proceeds to step 69 described below.

If the app is closed or if the app is dormant in the background and/or if location services are off 59, the service will request to use multitasking 61 on the device continue to run the identification process on the device 1. The rules around multi-tasking are set by Apple Inc. and further information can be read from https://developer.apple.com/library/ios/documentation/iphone/conceptual/iphoneosprogrammingguide/ManagingYourApplicationsFlow/ManagingYourApplicationsFlow.html. Assuming that such a request is permitted, as outlined in step 62, the service assesses if the now playing song has changed since the last query 65. If the now playing song has changed 65, the service reads the iPhone library 68 and proceeds to step 69 described below. If the now playing song has not changed, the service does not proceed again until multitasking is permitted 62.

In addition, the service subscribes to Apple's location monitoring 60 and if there is a change in location 66, the location and time of this change is added to a location database 67 which is then used to append location to the song play 74 in advance of being sent to a server 75.

For every song queried on the iOS device's library, if the last played time is more recent than the last synced 69 then it is stored in the local database 70. An example of this would be when the last sync takes place at 11 am. If the last played song is identified at 1 μm (which is two hours after the last sync), then the song is stored in the Local Song Play DB 70. Taking another example, if the last played song is identified at 10 am, then the song will not be stored in the Local Song Play DB 70 as the last sync occurred later than the last played song. The next step involves a scan of the Local Song play Database 71 and if this song has not already been sent to the server 72 it will be sent to the server 75. As outlined above, before step 75, the system uses the location database to calculate the location at the time that the song was played 73. If this query is successful, location data can be added to the song information 74. For the purposes of this FIG. 6, song metadata is just one embodiment of the type of metadata that can be identified on an iOS device as this could apply equally to audio files or other media content played on through the device's native players (eg video). The result is that the music or other audio metadata played is identified by the system and allows a third party app developer to use this information 4. A visual representation of this is set out in the example of a front-end activity feed in a third party application FIG. 7.

Figure 7:
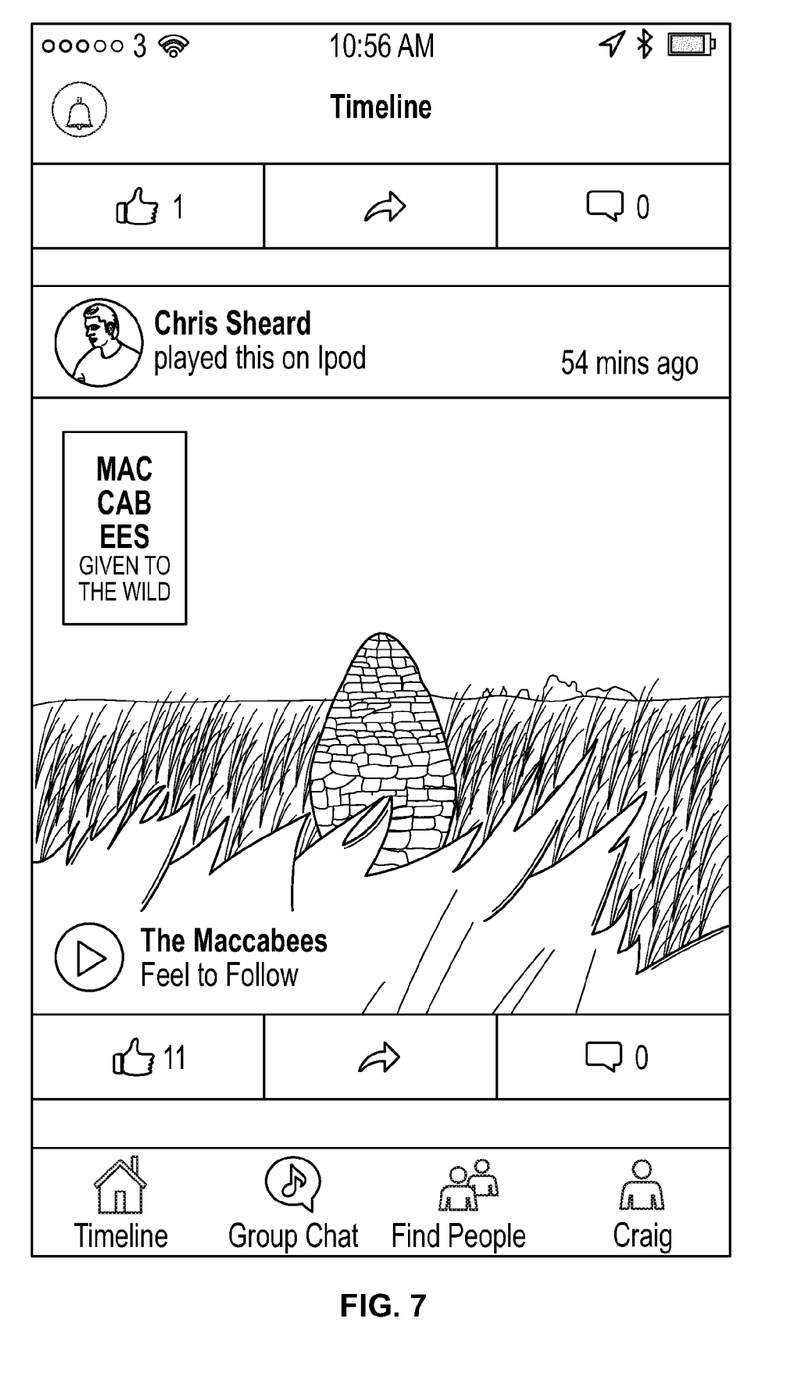
FIG. 7 is an example of a front-end design on a third party application illustrating a song capture from the native iPod music player on an iPhone using the invention to identify this song.

FIG. 7 illustrates one embodiment of point of information exchange through an activity feed to which a third party app developer could build to share song play information and music listening history with others and in particular, it is appreciated that the system may also permit a user to browse or search the content information stored in and/or available through the activity feed. Through the point of interest exchange, which preferably is incorporated into the system in real time for access by others, users may review the unified music feed and see what music or other audio metadata has been identified on an iOS device. In FIG. 7 for example, the song 'Feel to Follow' by the Maccabees was played and captured on an iOS native iPod player and displayed in a third party application.

Figure 8:
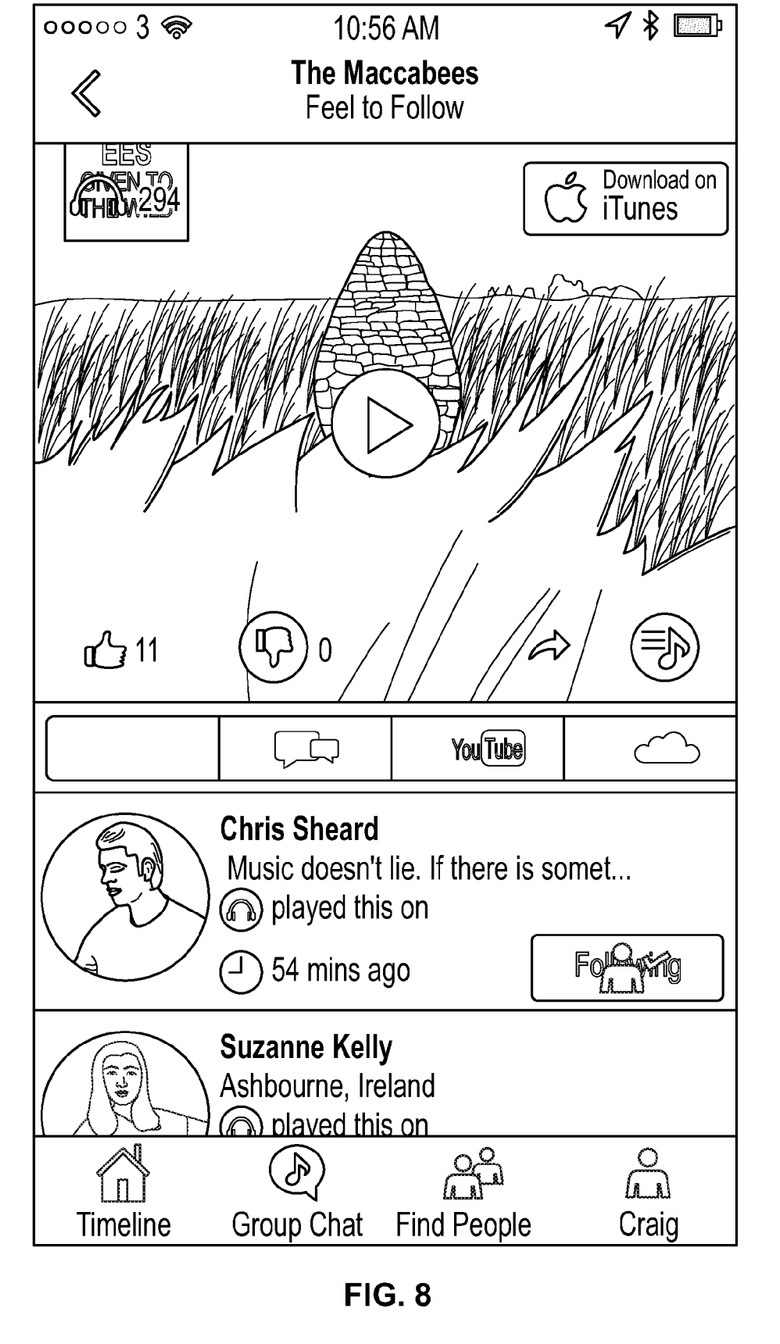
FIG. 8 is an example of a front-end embodiment of the identification of a song with a corresponding purchase and download link for the relevant song identified.

Furthermore it should be noted by reference to FIG. 8 that any song listed can be purchased from a number of content providers as set out in FIG. 8. In this example, a user can buy the song 'Feel to Follow' by the Maccabees or can stream it through their music streaming service of choice.

Figure 9:
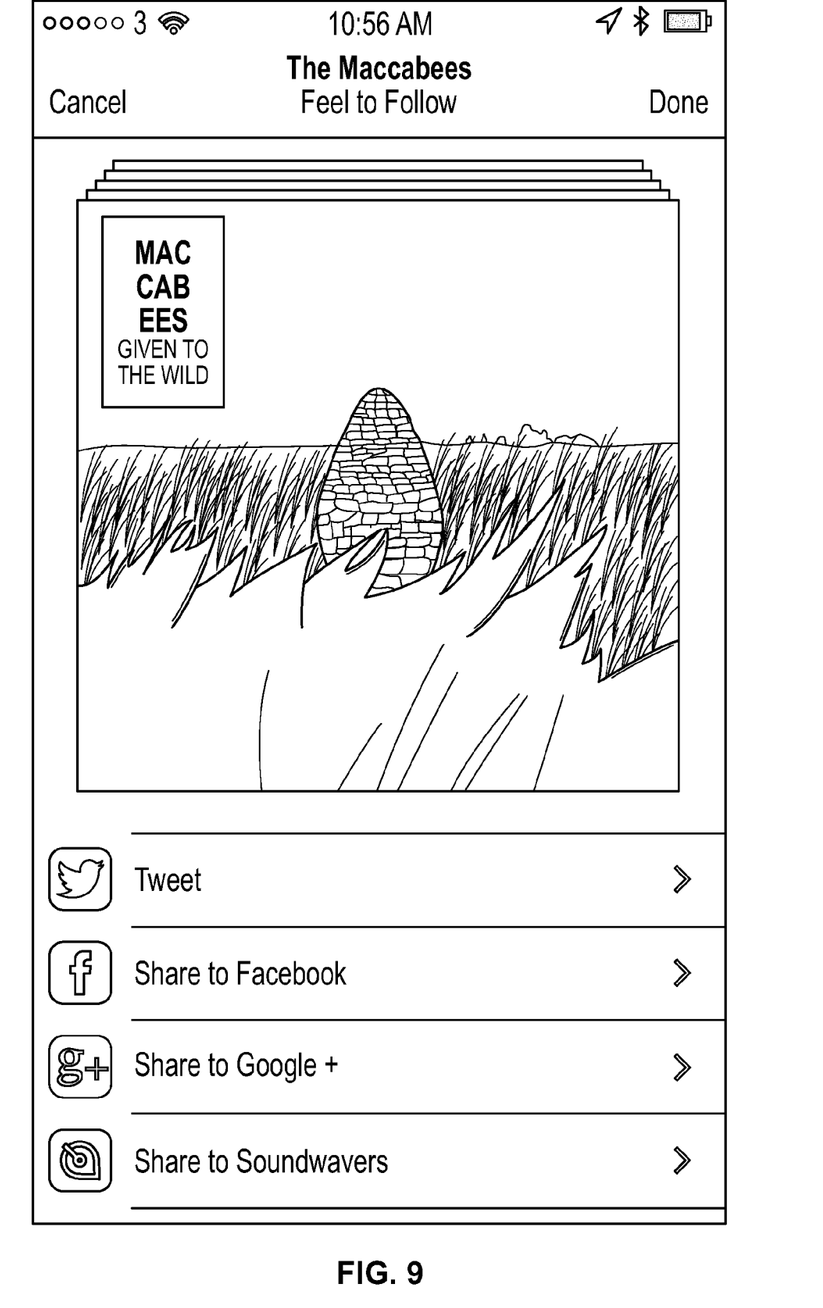
FIG. 9 is an example of the share functionality which allows a user to share identified content with other users in a conveyance system.

FIG. 9 illustrates how a third party application could allow any such music or audio metadata identified to be shared through a social network or other conveyance system.

Thus the reader will see that at least one embodiment of the identification system provides a more comprehensive and efficient approach to capturing music or other audio metadata on an iOS device. Furthermore, the identification method and apparatus described has the additional advantages in that:

it allows for music or other audio metadata to be identified from the native iPod player on an iOS device when an app is open, closed or running in the background;

it identifies this content in the most efficient manner possible using three separate but complimentary methods to ensure that there is minimal drain on battery power;

it allows for the contextualization of this metadata by identifying the location, timestamp and user ID associated with data when it played;

it allows for an efficient way to display this information as a unified music feed using a graphical and textual interface to visualise this information automatically to the end user through third party applications;

it allows for a user to purchase any such music or other audio metadata identified;

it provides a mechanism for users to share such music or other audio metadata, with other users within a social network or other conveyance system;

While the above description contains many specificities, these should not be construed as limitations on the scope, but rather as an exemplification of one or several embodiments thereof. Many other variations are possible. Accordingly, the scope should be determined not by the embodiments illustrated, but by the appended claims and their legal equivalents.

The embodiments in the invention described with reference to the drawings comprise a computer apparatus and/or processes performed in a computer apparatus. However, the invention also extends to computer programs, particularly computer programs stored on or in a carrier adapted to bring the invention into practice. The program may be in the form of source code, object code, or a code intermediate source and object code, such as in partially compiled form or in any other form suitable for use in the implementation of the method according to the invention. The carrier may comprise a storage medium such as ROM, e.g. CD ROM, or magnetic recording medium, e.g. a floppy disk or hard disk. The carrier may be an electrical or optical signal which may be transmitted via an electrical or an optical cable or by radio or other means.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments hereinbefore described but may be varied in both construction and detail.

The invention claimed is:

1. An apparatus comprising:
a device having at least one processor and at least one memory including computer program code configured to, with the at least one processor, cause the device to:
perform an identification of music or other audio metadata associated with one or more media content items played on a device, to be provided to a service associated with an application on the device;
wherein for each of the one or more media content items, the device:
determines a last played time when the media content item was last played by a media content player on the device, by reading a library at the device, and a time at which the device was last synced with a server associated with the service and in communication in the device; and
determines whether the last played time associated with the media content item is more recent than the time at which the device was last synced with the server, and if so:
stores a timestamp data indicative of the last played time associated with the media content item, in a local database at the device,
determines a location data associated with the media content item and the last played time associated with the media content item, wherein the location data is indicative of a location where the media content item was last played, and sends the timestamp data indicative of the last played time associated with the media content item, the associated location data, and a music or other audio metadata identifying the media content item, to the server associated with the service, in response to determining that the last played time associated with the media content item is more recent than the time at which the device was last synced with the server.

2. The apparatus of claim 1, wherein the device is configured to determine a user ID associated with playing of the one or more media content items on the device, to be appended to the music or other audio metadata as it is being captured.

3. The apparatus of claim 1, wherein the music or other audio metadata is provided to the application running on the device, and the device including the at least one processor and the at least one memory are further configured to identify the music or other audio metadata associated with played media content items while the application is closed or running in the background.

4. A computer implemented method to perform identification of music or other audio metadata played on a device, said method comprising:

determining, for each of one or more media content items, by reading a library at the device, a last played time when a media content item was last played by a media content player on the device;

determining a time at which the device was last synced with a server in communication with the device and providing a service associated with an application on the device;

determining whether the last played time associated with the media content item is more recent than the time at which the device was last synced with the server, and if so:

storing a timestamp data indicative of the last played time associated with the media content item, in a local database at the device;

determining a location data associated with the media content item and the last played time associated with the media content item was last played by the media content player on the device, wherein the location data is indicative of a location where the media content item was last played; and sending, as the data associated with the playing of the particular song on the particular device, the timestamp data indicative of the last played time associated with the media content item, the associated location data, and a music or other audio metadata identifying the media content item, to the server associated with the service, in response to determining that the last played time associated with the media content item is more recent than the time at which the device was last synced with the server.

5. The computer implemented method of claim 4, further comprising: determining a user ID associated with playing of the one or more media content items on the device, to be appended to the music or other audio metadata as it is being captured.

6. The apparatus of claim 1, wherein the device including the at least one processor and the at least one memory are configured to monitor a geographic location or region associated with the device, while the application is closed or running in the background.

7. The apparatus of claim 6, wherein the geographic location or region associated with the device is defined by a geofence and the device including the at least one processor and the at least one memory are configured to determine whether a currently playing media content item has changed, upon detecting that the device has moved beyond the geofence.

8. The apparatus of claim 1, wherein the device including the at least one processor and the at least one memory are configured to send and receive periodic push notifications communicated between the service and the device, indicative of media content items played on the device by the media content player, while the application is closed or running in the background.

9. The apparatus of claim 1, wherein the at least one processor and the at least one memory are configured to receive a request from the service, for use of multitasking services on the device, to report media content items played on the device by the media content player, while the application is closed or running in the background.

10. The apparatus of claim 1, wherein both the application running on the device, and the media content player on the device, are adapted to play music or other audio media content; and wherein the service provided at the server shares the identification of media content items played on the device by the media content player.

11. The computer implemented method of claim 4, wherein the music or other audio metadata is provided to the application running on the device, and wherein the method further comprises identifying the music or other audio metadata while the application is closed or running in the background.

12. The computer implemented method of claim 4, wherein the method further comprises monitoring a geographic location or region associated with the device, while the application is closed or running in the background.

13. The computer implemented method of claim 12, wherein the geographic location or region associated with the device is defined by a geofence, and wherein the method further comprises determining whether a currently playing media content item has changed, upon detecting that the device has moved beyond the geofence.

14. The computer implemented method of claim 4, wherein the method further comprises sending and receiving periodic push notifications communicated between the service and the device, indicative of media content items played on the device by the media content player, while the application is closed or running in the background.

15. The computer implemented method of claim 4, further comprising receiving a request from the service, for use of multitasking services on the device, to report media content items played on the device by the media content player, while the application is closed or running in the background.

16. The computer implemented method of claim 4, wherein both the application running on the device, and the media content player on the device, are adapted to play music or other audio media content; and wherein the service provided at the server shares the identification of media content items played on the device by the media content player.

17. A non-transitory computer readable storage medium including instructions stored thereon which when read and executed by a device including at least one processor and at least one memory, cause the device to perform a method comprising:

determining, for each of one or more media content items, by reading a library at the device, a last played time when a media content item was last played by a media content player on the device;

determining a time at which the device was last synced with a server in communication with the device and providing a service associated with an application on the device;

determining whether the last played time associated with the media content item is more recent than the time at which the device was last synced with the server, and if so:

storing a timestamp data indicative of the last played time associated with the media content item, in a local database at the device;

determining a location data associated with the media content item and the last played time associated with the media content item was last played by the media content player on the device, wherein the location data is indicative of a location where the media content item was last played; and sending, as the data associated with the playing of the particular song on the particular device, the timestamp data indicative of the last played time associated with the media content item, the associated location data, and a music or other audio metadata identifying the media content item, to the server associated with the service, in response to determining that the last played time associated with the media content item is more recent than the time at which the device was last synced with the server.

\* \* \* \* \*